(12) United States Patent
Liu et al.

(10) Patent No.: US 9,533,470 B2
(45) Date of Patent: Jan. 3, 2017

(54) CUSHION BLOCK FOR GLASS

(71) Applicants: BOE TECHNOLOGY GROUP CO., LTD., Beijing (CN); Beijing Boe Display Technology Co., Ltd., Beijing (CN)

(72) Inventors: Hailong Liu, Beijing (CN); Xuesong Gao, Beijing (CN); Hualong Wang, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/802,065

(22) Filed: Jul. 17, 2015

(65) Prior Publication Data

US 2016/0223134 A1    Aug. 4, 2016

(30) Foreign Application Priority Data

Jan. 30, 2015    (CN) .......................... 2015 1 0051611

(51) Int. Cl.
*F16M 13/00*    (2006.01)
*B32B 17/06*    (2006.01)

(52) U.S. Cl.
CPC .................... *B32B 17/06* (2013.01)

(58) Field of Classification Search
CPC .... F16M 2200/08; F16M 13/00; F16M 11/10; F16M 11/22; F16M 11/00; F16M 11/041; F16M 13/02; F16M 11/08; F16M 5/00; F16M 11/24; F16M 11/04; F16M 13/022; F16M 11/2014; F16M 7/00; F16M 11/18

(Continued)

(56) References Cited

U.S. PATENT DOCUMENTS 2,951,668 A * 9/1960 Peterka .................. A47G 1/215
248/466
3,049,323 A * 8/1962 Peterka .................. A47G 1/215
248/201

(Continued)

*Primary Examiner* — Steven Marsh
(74) *Attorney, Agent, or Firm* — Calfee, Halter & Griswold LLP

(57) ABSTRACT

The present invention relates to the technical field of liquid crystal panel manufacture, and discloses a cushion block for glass comprising a cushion block body. The cushion block body comprises a support part, at least a portion of which is configured for extending into the underneath of the glass to support a bottom surface of the glass, the portion of the support part configured for extending into the underneath of the glass forming a supporting surface for supporting the bottom surface of the glass; a fixation part fixedly connected with the support part, configured for fixedly connecting with a base platform; and a limitation protrusion fixed to the support part and higher than the supporting surface, wherein the limitation protrusion is located outside the portion of the support part configured for extending into the underneath of the glass, and a surface of the limitation protrusion connecting with the supporting surface forms a limitation surface higher than the supporting surface, configured for abutting against a side of the glass supported on the supporting surface. For the above cushion block for glass, while the supporting surface supports the bottom surface of the glass, the limitation surface can abut against the side surface of the glass to prevent the glass from sliding along the supporting surface, and moreover to prevent the glass from falling off from the cushion block for glass during overturn and movement, thereby improving the support stability of the cushion block for the glass.

10 Claims, 2 Drawing Sheets

(58) Field of Classification Search
USPC ............... 248/346.5, 346.01, 346.03, 221.11
See application file for complete search history.

(56) References Cited

U.S. PATENT DOCUMENTS

| | | | | |
|---|---|---|---|---|
| 3,705,470 A | * | 12/1972 | Kent | ........................ B60J 10/45 |
| | | | | 29/469.5 |
| 4,905,432 A | * | 3/1990 | Romie | ...................... B60J 10/70 |
| | | | | 296/201 |
| 5,466,508 A | * | 11/1995 | Brocke | .................... B60J 10/82 |
| | | | | 296/216.09 |
| 9,255,592 B2 | * | 2/2016 | Sears | ................... F16M 11/041 |

* cited by examiner

CUSHION BLOCK FOR GLASS

RELATED APPLICATIONS

The present application claims the benefit of Chinese Patent Application No. 201510051611.3, filed Jan. 30, 2015, the entire disclosure of which is incorporated herein by reference.

FIELD OF THE INVENTION

The present invention relates to the technical field of liquid crystal panel manufacture, and in particular to a cushion block for glass.

BACKGROUND ART OF THE INVENTION

According to the prior art, in the technical field of liquid crystal panel manufacture, glass is generally supported by a cushion block during processing. However, the surface of the cushion block for the glass facing the glass to support a bottom surface of the glass is designed typically as a planar surface. And as the size of glass gradually increases, due to factors such as deformation caused by the glass per se, large-sized glass often comes off from the surface of the cushion block during rotation or movement, which may result in shatters because of bumping and knocking between the glass and other components. As a result, the support stability of the cushion block for the glass is rather poor.

SUMMARY OF THE INVENTION

Embodiments of the present invention provide a cushion block for glass, which is capable of supporting the glass while limiting the glass along a direction in parallel with a supporting surface of the cushion block, thereby reducing the risk that the glass may come off during rotation or movement and improving the support stability of the cushion block for the glass.

The embodiments of the present invention provide the following technical solutions:

A cushion block for glass comprising a cushion block body, wherein the cushion block body comprises a support part, at least a portion of which is configured for extending into the underneath of the glass to support a bottom surface of the glass, the portion of the support part configured for extending into the underneath of the glass forming a supporting surface for supporting the bottom surface of the glass; a fixation part fixedly connected with the support part and configured for fixedly connecting with a base platform; and a limitation protrusion fixed to the support part and higher than the supporting surface. The limitation protrusion is located outside the portion of the support part configured for extending into the underneath of the glass, and a surface of the limitation protrusion connecting with the supporting surface forms a limitation surface higher than the supporting surface, configured for abutting against a side of the glass supported on the supporting surface.

In the above cushion block for glass, the supporting surface formed by the portion of the support part configured for extending into the underneath of the glass enables the cushion block to support the glass; and in the limitation protrusion located outside the portion of the support part configured for extending into the underneath of the glass, the limitation surface formed by the surface of the limitation protrusion connecting with the supporting surface is higher than the supporting surface formed by the support part, so the limitation surface can abut against a side of the glass supported on the supporting surface, and hence it becomes possible to limit the glass in a direction along the supporting surface towards the limitation protrusion and in parallel with the supporting surface. Therefore, while the supporting surface supports the bottom surface of the glass, the limitation surface can abut against the side of the glass to prevent the glass from sliding in a direction along the supporting surface towards the limitation protrusion and in parallel with the supporting surface, and moreover to prevent the glass from falling off from the cushion block during overturn and movement, thereby improving the support stability of the cushion block for the glass.

In one embodiment, the limitation surface is an arc concave, the distance between the arc concave and the plane of the supporting surface gradually increases in a direction along the supporting surface towards the limitation protrusion and in parallel with the supporting surface.

Furthermore, the radian of the arc concave can be greater than 0 degree and less than 180 degrees.

In a further embodiment, the limitation protrusion is a stepped protrusion comprising one step.

Alternatively, the limitation protrusion can be a stepped protrusion comprising a plurality of steps.

Further, the limitation surface can be a side surface of a first step having the smallest height of the stepped protrusion, which side surface is perpendicular to the supporting surface.

In a further embodiment, the limitation protrusion and the support part can be an integrally formed structure.

In a further embodiment, a portion of the support part is configured for extending into the underneath of the glass to support the bottom surface of the glass, and the fixation part is located on a side of the support part facing away from the supporting surface to form, in cooperation with the support part, a structure with an L-shaped cross-section; the limitation protrusion is fixed on the support part and located on a side of the support part facing away from the fixation part.

Further, the fixation part, the support part and the limitation protrusion can be an integrally formed structure.

Further, the fixation part can be made from PEEK (Poly Ether Ether Ketone) material or PI (polyimide) resin material, and the support part can be made from PEEK material or PI resin material.

According to a further embodiment of the present invention, the cushion block for glass can further comprise a fixation sleeve. The fixation part is provided with a fixation hole through the thickness direction thereof, and the fixation sleeve penetrates through the fixation hole and pivots on the fixation part; and one end of the fixation sleeve forms a cap and the other end of the fixation sleeve is configured for fixedly connecting with the base platform, a diameter of the cap being larger than that of the fixation hole; and an axial line of the fixation sleeve is parallel to the supporting surface. After being mounted on the base platform, a cushion block for glass having the above structure can be adjusted by rotation within a certain range around the axial line of the fixation sleeve, which enables adjustment of the parallelism between the supporting surface and the bottom surface of the glass and enables the supporting surfaces of various cushion blocks for glass to be adjusted to be in the same plane, so as to avoid situation that the glass is supported at a single point on the glass when supported by the cushion blocks, thereby mitigating the stress-focus phenomenon occurring on the glass when the cushion block supports the glass and diminishing the risk that the glass may be shattered due to the stress-focus phenomenon.

DETAILED DESCRIPTION OF EMBODIMENTS

The technical solutions of embodiments of the present invention will be described clearly and completely in the following text with reference to the figures of the embodiments of the present invention. Apparently, the described embodiments are only a part of the embodiments of the present invention, rather than all of them. Based on the embodiments of the present invention, all other embodiments obtainable by a skilled person in the art without inventive efforts shall fall within the protection scope of the present invention.

Figure 1:
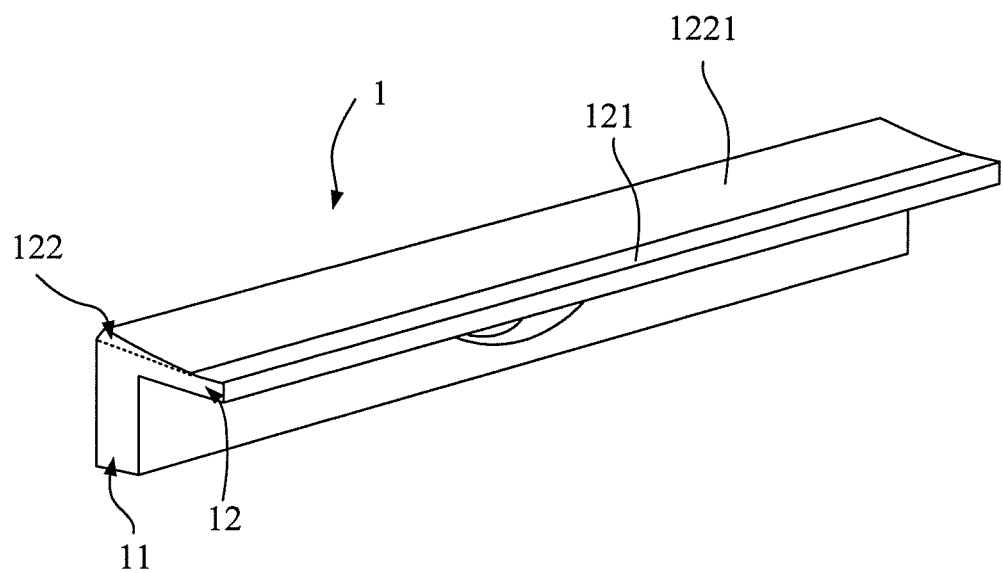
FIG. 1 is a structural schematic view of a cushion block for glass provided by an embodiment of the present invention.
Figure 4:
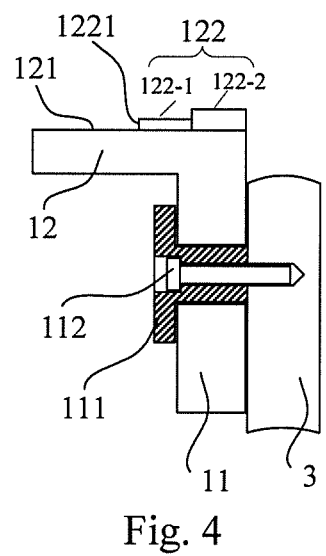
FIG. 4 is a structural schematic view of a cushion block for glass provided by a further embodiment of the present invention in connection with a base platform.

Referring to FIG. 1 and FIG. 4, a cushion block for glass provided by an embodiment of the present invention may comprise a cushion block body 1. The cushion block body 1 may comprise a support part 12, at least a portion of which is configured for extending into the underneath of the glass to support a bottom surface of the glass, and a fixation part 11 fixedly connected with the support part 12, configured for fixedly connecting with a base platform 3. The portion of the support part 12 configured for extending into the underneath of the glass forms a supporting surface 121 for supporting the bottom surface of the glass.

The cushion block body 1 may also comprise a limitation protrusion 122 fixed to the support part 12 and higher than the supporting surface 121, the limitation protrusion 122 can be located outside the portion of the support part 12 configured for extending into the underneath of the glass, and a surface of the limitation protrusion 122 connecting with the supporting surface 121 may form a limitation surface 1221 higher than the supporting surface 121, configured for abutting against a side of the glass supported on the supporting surface 121.

In the above cushion block for glass, the supporting surface 121 formed by the portion of the support part 12 configured for extending into the underneath of the glass enables the cushion block to support the glass; and for the limitation protrusion 122 located outside the portion of the support part 12 configured for extending into the underneath of the glass, since the limitation surface 1221 formed by the surface of the limitation protrusion 122 connecting with the supporting surface 121 is higher than the supporting surface 121 formed by the support part 12, the limitation surface 1221 can abut against a side of the glass supported on the supporting surface 121, hence, it becomes possible to limit the glass in a direction along the supporting surface 121 towards the limitation protrusion 122 and in parallel with the supporting surface 121. Therefore, while the supporting surface 121 supports the bottom surface of the glass, the limitation surface 1221 can abut against the side of the glass to prevent the glass from sliding in a direction along the supporting surface 121 towards the limitation protrusion 122 and in parallel with the supporting surface 121, and moreover to prevent the glass from falling off from the cushion block for glass during overturn and movement, thereby improving the support stability of the cushion block for the glass.

Figure 2:
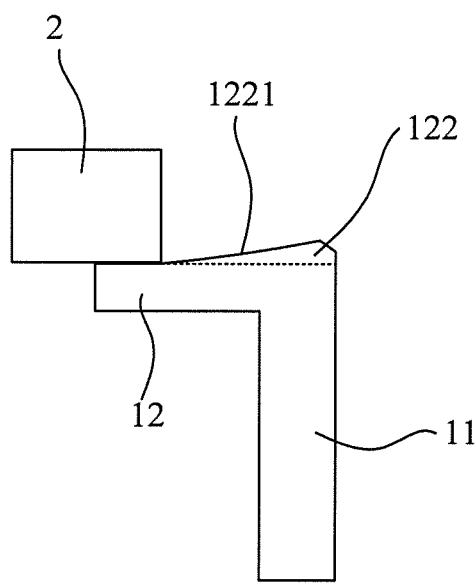
FIG. 2 is a schematic cross-section view of a cushion block for glass provided by an embodiment of the present invention.

According to an embodiment of the present invention, as shown in FIG. 1 and FIG. 2, in the cushion block for glass mentioned above, the limitation surface 1221 formed by the limitation protrusion 122 above the support part 12 can be an arc concave; the distance between the arc concave and the plane of the supporting surface 121 gradually increases in a direction along the supporting surface 121 towards the limitation surface 1221 and in parallel with the supporting surface 121.

In a cushion block for glass having the above structure, the limitation surface 1221 can be the arc concave. When a plurality of cushion blocks for glass are arranged on the base platform as required and the glass is horizontally displaced, the supporting surfaces 121 on the cushion blocks for glass can be in a same plane, and each limitation surface 1221 is higher than the supporting surface 121. Therefore, the glass 2 has to overcome its own gravity when sliding from the supporting surface 121 towards the direction of the limitation protrusion 122, which makes it difficult to fall off from the supporting surface 121.

In an embodiment, the radian of the arc concave can be greater than 0 degree and less than 180 degrees.

Figure 3:
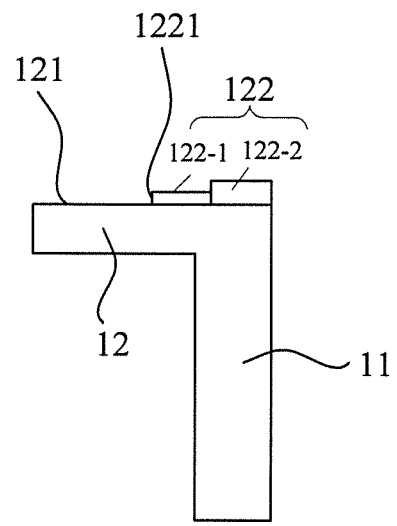
FIG. 3 is a schematic cross-section view of a cushion block for glass provided by another embodiment of the present invention.

In a further embodiment, as shown in FIG. 3, the limitation protrusion 122 can be a stepped protrusion, and the limitation surface 1221 can be a side surface of a step of the stepped protrusion, the side surface being perpendicular to the supporting surface 121.

It should be understood that the stepped protrusion can be a structure comprising only one step. In this case, a side surface of the step perpendicular to the supporting surface 121 is namely the limitation surface 1221. Alternatively, in other embodiments, the stepped protrusion may comprise a plurality of steps. For example, FIG. 3 shows a stepped protrusion 122 comprising two steps 122-1 and 122-2. In the case where multiple steps are comprised, the limitation surface 1221 can be a side surface of any one of the steps of the stepped protrusion 122. In other words, the glass can be supported on any step other than the highest one, and the surface of the step can serve as a further supporting surface for supporting the bottom surface of the glass as long as the surface width of the step satisfies the requirement of the glass to be supported. In this case, the side surface of the glass to be supported can abut against a side surface of a neighboring step higher than the step supporting the glass, and the side surface of the neighboring step is namely the limitation surface. Therefore, a cushion block for glass with such a stepped protrusion comprising a plurality of steps can be applicable to glass having different widths, thereby satisfying the requirement of supporting glass having different widths and enhancing the flexibility of the application of the cushion block for glass.

In an embodiment, the limitation surface 1221 can be a side surface of a first step 122-1 having the smallest height of the stepped protrusion 122, the side surface being perpendicular to the supporting surface 121. In this case, the bottom surface of the glass is supported by the supporting surface 121 of the support part 12.

In the cushion block for glass with above structure, the limitation surface 1221 can be perpendicular to the supporting surface 121, therefore, when the glass is supported on the supporting surface 121, a side surface of the glass is parallel to and abuts against the limitation surface 1221, which increases the contact area between the limitation surface 1221 and the side surface of the glass and hence improves the stability of the limitation of the glass by the limitation surface 1221 along a direction in parallel with the supporting surface 121 and perpendicular to the limitation surface 1221.

In an embodiment, as shown in FIG. 1, FIG. 2 or FIG. 3, a portion of the support part 12 is configured for extending into the underneath of the glass 2 to support the bottom surface of the glass 2, and the fixation part 11 is located on a side of the support part 12 facing away from the supporting surface 121 to form, in cooperation with the support part 12, a structure with an L-shaped cross-section; the limitation protrusion 122 may be fixed on the support part 12 and located on a side of the support part 12 facing away from the fixation part 11.

In an alternative embodiment, in order to facilitate the manufacture of the cushion block for glass, the limitation protrusion 122 and the support part 12 can be an integrally formed structure.

In a further alternative embodiment, for the above mentioned cushion blocks for glass, the fixation part 11, the support part 12 and the limitation protrusion 122 can be an integrally formed structure.

In a cushion block for glass according to an embodiment of the present invention, the fixation part 11 can be made from PEEK (Poly Ether Ether Ketone) material or PI (polyimide) resin material, and the support part 12 can be made from PEEK material or PI resin material. Due to the fact that the fixation part 11 and the support part 12 are made from PEEK material or PI resin material, damage to the glass can be alleviated when the supporting surface 121 of the support part 12 of the cushion block for glass is in contact with the glass.

According to a further embodiment of the present invention, in order to improve the flatness between the supporting surfaces 121 of multiple cushion blocks for glass when a plurality of the cushion blocks for glass as described above are used together, as shown in FIG. 4, the cushion block for glass can further comprise a fixation sleeve 111. The fixation part 11 is provided with a fixation hole through the thickness direction thereof, and the fixation sleeve 111 can penetrate through the fixation hole and pivot on the fixation part 11; and one end of the fixation sleeve 111 may form a cap and the other end thereof may be configured for fixedly connecting with the base platform 3, a diameter of the cap being larger than that of the fixation hole; and an axial line of the fixation sleeve 111 is parallel to the supporting surface 121. Thus, after being mounted on the base platform, the cushion block for glass can be adjusted by rotation within a certain range around the axial line of the fixation sleeve 111, which enables adjustment of the parallelism between the supporting surface 121 and the bottom surface of the glass and enables the supporting surfaces of various cushion blocks for glass to be adjusted to be in the same plane, so as to avoid the situation that the glass is supported at a single point on the glass when supported by the cushion blocks, thereby mitigating the stress-focus phenomenon occurring on the glass when the cushion block supports the glass and diminishing the risk that the glass may be shattered due to the stress-focus phenomenon.

In an embodiment, as shown in FIG. 4, a stepped hole can be formed inside the fixation sleeve 111, and for the stepped hole, a diameter of the end close to the fixation sleeve 111 which forms a cap is greater than that of the other end. The fixation sleeve 111 and the base platform 3 can be fixed by means of a fastening screw 112, and a screw cap of the fastening screw can be pressed against a step surface inside the stepped hole.

Obviously, those skilled in the art can make various improvements and modifications to the embodiments of the present invention without deviating from the spirits and scopes of the present invention. Thus if the improvements and modifications to the embodiments fall within the scopes of the claims of the present invention and the equivalent techniques thereof, the present invention is intended to include them too.

The invention claimed is:

1. A cushion block for glass comprising a cushion block body, the cushion block body comprising:
a support part, at least a portion of which is configured for extending into the underneath of a glass to support a bottom surface of the glass, the portion of the support part configured for extending into an underneath of the glass forming a supporting surface for supporting the bottom surface of the glass;
a fixation part fixedly connected with the support part and configured for fixedly connecting with a base platform; and
a limitation protrusion fixed to the support part and higher than the supporting surface,
wherein the limitation protrusion is located outside the portion of the support part configured for extending into the underneath of the glass, and wherein a surface of the limitation protrusion connecting with the supporting surface forms a limitation surface higher than the supporting surface, configured for abutting against a side of the glass supported on the supporting surface,
wherein the cushion block further comprises a fixation sleeve, wherein the fixation part is provided with a fixation hole through the thickness direction thereof, and the fixation sleeve penetrates through the fixation hole and pivots on the fixation part; and one end of the fixation sleeve forms a cap and the other end is configured for fixedly connecting with the base platform, a diameter of the cap being larger than that of the fixation hole; and an axial line of the fixation sleeve is parallel to the supporting surface.

2. The cushion block for glass according to claim 1, wherein the limitation surface is an arc concave; and wherein the distance between the arc concave and the plane of the supporting surface gradually increases in a direction along the supporting surface towards the limitation protrusion and in parallel with the supporting surface.

3. The cushion block for glass according to claim 2, wherein the radian of the arc concave is greater than 0 degree and less than 180 degrees.

4. The cushion block for glass according to claim 1, wherein the limitation protrusion is a stepped protrusion comprising one step.

5. The cushion block for glass according to claim 1, wherein the limitation protrusion is a stepped protrusion comprising a plurality of steps.

6. The cushion block for glass according to claim 5, wherein the limitation surface is a side surface of a first step having the smallest height of the stepped protrusion, which side surface is perpendicular to the supporting surface.

7. The cushion block for glass according to claim 1, wherein a portion of the support part is configured for extending into the underneath of the glass to support the bottom surface of the glass, and the fixation part is located on a side of the support part facing away from the supporting surface to form, in cooperation with the support part, a structure with an L-shaped cross-section; and the limitation protrusion is fixed on the support part and located on a side of the support part facing away from the fixation part.

8. The cushion block for glass according to claim 7, wherein the limitation protrusion and the support part are an integrally formed structure.

9. The cushion block for glass according to claim 1, wherein the fixation part, the support part and the limitation protrusion are an integrally formed structure.

10. The cushion block for glass according to claim 9, wherein the fixation part is made from PEEK material or PI resin material, and the support part is made from PEEK material or PI resin material.

* * * * *